United States Patent [19]

Steffier

[11] Patent Number: 5,498,678
[45] Date of Patent: Mar. 12, 1996

[54] SUSPENSION POLYMERIZATION PROCESS FOR WATER-SOLUBLE MONOMERS

[75] Inventor: Larry W. Steffier, Cherry Hill, N.J.

[73] Assignee: Rohm and Haas Company, Philadelphia, Pa.

[21] Appl. No.: 994,246

[22] Filed: Dec. 21, 1992

[51] Int. Cl.$^6$ .................. C08F 2/10; C08F 2/00; C08F 20/60
[52] U.S. Cl. .......................... 526/200; 526/307
[58] Field of Search .................. 526/200, 307

[56] References Cited

U.S. PATENT DOCUMENTS

| | | | |
|---|---|---|---|
| 2,845,408 | 7/1958 | Melamed | 260/89.7 |
| 2,980,657 | 4/1961 | Melamed | 260/86.1 |
| 3,186,973 | 6/1965 | Maeder | 260/80.3 |
| 3,308,020 | 3/1967 | Wolf et al. | 167/65 |
| 3,383,281 | 5/1968 | Wolf et al. | 167/65 |
| 3,627,872 | 12/1971 | Parkinson | 424/79 |
| 3,692,895 | 9/1972 | Nelson et al. | 424/78 |
| 3,749,787 | 7/1973 | Hapworth et al. | 424/270 |
| 3,769,399 | 10/1973 | Hagerman et al. | 424/79 |
| 3,780,171 | 12/1973 | Irmscher et al. | 424/79 |
| 3,787,474 | 1/1974 | Daniels et al. | 260/459 |
| 3,846,541 | 11/1974 | Howard et al. | 424/79 |
| 3,943,114 | 3/1976 | Hoke | 260/85.5 AM |
| 3,974,272 | 8/1976 | Polli et al. | 424/78 |
| 4,027,009 | 5/1977 | Grier et al. | 424/78 |
| 4,082,701 | 4/1978 | Fries et al. | 260/2.1 E |
| 4,139,684 | 2/1979 | Couek et al. | 521/27 |
| 4,189,559 | 2/1980 | Bueltjer et al. | 526/203 |
| 4,198,395 | 4/1980 | DeSimone | 424/79 |
| 4,229,267 | 10/1980 | Steinecker | 204/55 R |
| 4,237,218 | 12/1980 | Monthony et al. | 435/2 |
| 4,340,585 | 7/1982 | Bozatta et al. | 424/79 |
| 4,343,730 | 8/1982 | Becker | 524/551 |
| 4,359,540 | 11/1982 | McEatire et al. | 521/129 |
| 4,382,853 | 5/1983 | McCoy | 208/188 |
| 4,387,017 | 6/1983 | McEatire et al. | 208/188 |
| 4,393,145 | 7/1983 | Zemp | 521/38 |
| 4,405,015 | 9/1983 | McCoy et al. | 166/267 |
| 4,495,367 | 1/1985 | Dammans | 564/208 |
| 4,528,350 | 7/1985 | Goossens et al. | 526/307 |
| 4,536,294 | 8/1985 | Gullet et al. | 210/730 |
| 4,649,048 | 3/1987 | Johnson | 424/81 |
| 4,673,704 | 6/1987 | Flesher et al. | 524/519 |
| 4,684,704 | 8/1987 | Craig | 526/200 |
| 4,708,997 | 11/1987 | Stanley, Jr. et al. | 526/207 |
| 4,728,696 | 3/1988 | VanPhung | 526/304 |
| 4,731,419 | 3/1988 | Fong | 525/328.2 |
| 4,759,923 | 7/1988 | Buntin et al. | 424/440 |
| 4,788,267 | 11/1988 | Chiao et al. | 526/287 |
| 5,068,255 | 11/1991 | Harris | 521/28 |

FOREIGN PATENT DOCUMENTS

| | | |
|---|---|---|
| 489425 | 10/1992 | European Pat. Off. . |
| 2251367 | 6/1975 | France . |
| 1457958 | 12/1976 | United Kingdom . |

OTHER PUBLICATIONS

George Odian, "Principles of Polymerization", 3rd. Ed. 1991, John Wiley & Sons, Inc., pp. 302–303.
Susan Budavari, Maryadele J. O'Neil, Ann Smith, Patricia E. Heckelman, "The Merck Index" 11th Ed, 1989 p. 9894.

*Primary Examiner*—Joseph L. Schofer
*Assistant Examiner*—Wu C. Cheng
*Attorney, Agent, or Firm*—John E. Taylor, III

[57] ABSTRACT

A process is provided for suspension polymerization of water-soluble monomers in aqueous suspension to form spherical, unagglomerated polymer beads. The polymerization is conducted in the presence of a nonionic, substituted hydroxyalkylcellulose dispersant which is especially effective in protecting the monomer droplets from coalescence prior to their forming stable polymer particles.

15 Claims, No Drawings

SUSPENSION POLYMERIZATION PROCESS FOR WATER-SOLUBLE MONOMERS

This invention relates to suspension polymerization processes, and more particularly to suspension polymerization processes for water-soluble monomers.

BACKGROUND OF THE INVENTION

Suspension polymerization is commonly conducted in an aqueous suspending medium, by suspending discrete droplets of monomer in the aqueous medium, initiating a free-radical polymerization, and continuing the polymerization until the suspended droplets have formed solid, spherical particles. Such particles, especially when formed by copolymerization of a monoethylenically unsaturated monomer and a polyethylenically unsaturated, crosslinking monomer, are particularly useful as intermediate materials in the production of ion exchange resins. Many common monomers, such as styrene, α-methylstyrene, methyl methacrylate, ethyl acrylate and the like, are not soluble in water, and thus are well suited to suspension polymerization. However, some monomers, as for example acrylic acid, methacrylic acid, hydroxyethyl methacrylate, acrylonitrile, acrylamide, methacrylamide, vinyl pyridine, dimethylaminoethyl methacrylate and the like, are soluble in water to a significant extent.

When suspension polymerization is attempted with a monomer which is partially or fully water soluble, monomer partitions into the aqueous phase. In the case of fully water-soluble monomers, the suspended droplets may never even form, and even where the droplets form, several undesired phenomena occur during polymerization, such as the occurrence of emulsion, "popcorn" or precipitation polymers in the aqueous phase, caused by dissolved monomer forming insoluble polymer which precipitates from solution, or the formation of particle agglomerates caused by the presence of soluble polymers in the aqueous phase. The agglomerates lead to a polymer product with poor hydraulic characteristics, and the presence of polymer in the aqueous phase also leads to fouling of process equipment.

Techniques known to those skilled in the art for suspension polymerization of water-soluble monomers include saturating the aqueous suspending medium with a salt, e.g. an inorganic salt such as sodium chloride or sodium sulfate, to reduce the solubility of the monomer in the aqueous medium. This helps reduce, but not eliminate, some of the undesired phenomena. Most suspension stabilizers are insoluble or unstable in a high-salt, aqueous phase, and thus do not adequately protect the monomer droplets, allowing them to agglomerate.

SUMMARY OF THE INVENTION

I have discovered a suspension polymerization process which comprises forming a suspension of a mixture of monomers, which mixture includes a major amount of at least one water-soluble monomer and from about 0.1 to about 50 weight percent, based on the total monomer weight, of a crosslinking monomer, in an aqueous medium containing from about 5 weight percent to saturation of a water-soluble, non-reactive inorganic salt in the presence of a free-radical initiator and from about 0.01 to about 4 weight percent of a nonionic surfactant-type dispersant having a hydroxyalkylcellulose backbone, a molecular weight of from about 30,000 to 2,000,000, hydrophobic alkyl side chains containing from 1 to about 24 carbon atoms, the alkyl side chains being present at a level of from about 0.1 to about 10 alkyl side chains per 100 repeating units of the polymer backbone, and an average of from about 1 to about 8 ethylene oxide groups substituting each repeating unit of the polymer backbone, wherein the alkyl group in the hydroxyalkylcellulose backbone is from $C_1$ to $C_{24}$, establishing polymerization conditions in the suspension, and allowing the monomers to polymerize until they have formed water-insoluble particles.

DETAILED DESCRIPTION OF THE INVENTION

The water-soluble monomers useful in the present invention include, but are not limited to, acid monomers such as acrylic, methacrylic, itaconic, maleic, fumaric and crotonic acids and the like, water-soluble anhydrides such as acrylic anhydride and methacrylic anhydride, amino-substituted acrylamides and methacrylamides such as dimethylaminopropyl methacrylamide, dimethylaminoethyl methacrylamide, dimethylaminopropyl acrylamide, dimethylaminoethyl acrylamide, N, N-bis-(dimethylaminoethyl) methacrylamide, N, N-bis-(dimethylaminopropyl) acrylamide, N, N-bis-(dimethylaminoethyl) acrylamide, and N, N-bis-(dimethylaminopropyl) methacrylamide; amino-substituted acrylates and methacrylates such as dimethylaminoethyl methacrylate, dimethylaminopropyl methacrylate, dimethylaminoethyl acrylate and dimethylaminopropyl acrylate; hydroxyalkyl acrylates and methacrylates such as hydroxyethyl acrylate, hydroxyethyl methacrylate, hydroxypropyl methacrylate and hydroxypropyl acrylate; other nitrogen-substituted, water-soluble monomers such as acrylonitrile, vinyl pyridines, vinylbenzyl pyrrolidone, N-vinyl-2-pyrrolidone and the like; or mixtures thereof. The water-soluble monomer is present in the monomer mixture as the major component; that is, the water-soluble monomer or monomers are present at a level of at least 50 weight percent of the total monomers. As used herein, the term "water-soluble", as applied to monomers, indicates that the monomer has a water solubility of about one weight percent or greater; that is, at least about one gram of the monomer will dissolve in 100 g of water. In another embodiment of the present invention, the water solubility of the monomer is at least about 10 grams in 100 grams of water, and in yet another embodiment the water solubility is at least about 50 grams in 100 grams of water.

Crosslinking monomers useful in the present invention include both water-soluble and water-insoluble crosslinkers, including aromatic crosslinkers such as divinylbenzene, trivinylbenzene, divinylnaphthalene, divinyltoluene, divinylchlorobenzene, diallyl phthalate, divinylxylene, divinylethylbenzene. trivinylnaphthalene, polyvinylanthracenes and the like, and aliphatic crosslinkers such as diethyleneglycol divinyl ether, trimethylolpropane trimethacrylate, diethylene glycol divinyl ether, diethylene glycol dimethacrylate, ethylene glycol diacrylate, neopentyl glycol dimethacrylate, pentaerythritol tetra- and trimethacrylates, allyl acrylate, divinyl ketone, N ,N'-methylenediacrylimide, N,N'-methylene-dimethacrylimide, N,N'-ethylenediacrylimide, diallyl maleate, diallyl fumarate, diallyl succinate, diallyl carbonate, diallyl malonate, diallyl oxalate, diallyl adipate, diallyl sebacate, diallyl tartrate, diallyl tricarballylate, triallyl aconitate, triallyl citrate; and the polyallyl and polyvinyl ethers of glycol, glycerol and pentaerythritol, bisphenol-A dimethacrylate, the polyallyl and polyvinyl ethers of resorcinol, and the like, and mixtures thereof. Preferred crosslinking monomers are divinylbenzene, trimethylolpropane trimethacrylate, trimethylolpropane triacrylate, hexamethylene-bis-methacrylamide and diethylene glycol divinyl ether and mixtures thereof. The crosslinking monomer are present at a level from about 0.1 to about 50 percent, preferably from about 0.1 to about 20 percent,, by weight, of the total monomer mixture.

Other, non-water-soluble monomers may be present in a minor amount in the monomer mixture; that is, they may be present at less than 50% by weight of the total monomer mixture. Such non-water-soluble monomers are preferably present at less than about 25% by weight of the total monomer mixture. The non-water-soluble monomers useful in the present invention include those which are copolymerizable with the combination of the water-soluble monomer and the crosslinking monomer. These include both aromatic and aliphatic monomers having monoethylenic unsaturation, including those which are substituted with functional groups other than the ethylenic groups.

Polymerization initiators useful in the present invention include monomer-soluble initiators such as peroxides, hydroperoxides and related initiators, as for example benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide and the like. Also useful are azo initiators such as azodiisobutyronitrile, azodiisobutyramide, 2,2'-azo-bis-(2,4-dimethylvaleronitrile), azo-bis-(α-methylbutyronitrile) and dimethyl, diethyl or dibutyl azo-bis-(methylvalerate). The initiators are used at a level of from about 0.01 to about 5% by weight, based on the total weight of the monomers; preferably the peroxide initiators are used at a level of from about 0.01% to 3% by weight, based on the total weight of the monomers, and preferably the azo initiators are used at a level from about 0.01% to about 2% by weight, based on the total weight of the monomers. Preferred initiators are the azo initiators, and particularly preferred is 2,2'-azo-bis-(2,4-dimethylvaleronitrile).

Salts useful for reducing solubility of the water-soluble monomer in the aqueous phase are water-soluble, nonreactive inorganic salts of a monovalent, divalent or aluminum cation and a monovalent or divalent anion, including, but not limited to, water-soluble, non-reactive inorganic salts of a monovalent, divalent or aluminum cation and a monovalent or divalent anion, as for example sodium, potassium, lithium and ammonium salts of chloride, bromide, iodide, sulfate, carbonate and nitrate and the magnesium and calcium salts of chloride, bromide, iodide and nitrate. Preferred salts are sodium chloride, sodium sulfate and sodium nitrate. The salt is dissolved in the aqueous medium at levels from about 5 weight percent, based upon the total weight of the aqueous phase, to saturation of the salt in the aqueous phase. The term, "nonreactive", as applied to the salts herein, means that the salt does not react chemically with water, the monomers or the polymers formed from the monomers.

The dispersants useful in the present invention are nonionic surfactants having a hydroxyalkylcellulose backbone, hydrophobic alkyl side chains containing from 1 to about 24 carbon atoms, and an average of from about 1 to about 8 ethylene oxide groups, preferably from about 1 to about 5 ethylene oxide groups, substituting each repeating unit of the hydroxyalkylcellulose backbone, the alkyl side chains being present at a level of from about 0.1 to about 10 alkyl groups per 100 repeating units in the hydroxyalkylcellulose backbone. The alkyl group in the hydroxyalkylcellulose may contain from 1 to about 24 carbons, and may be linear, branched or cyclic. Preferred is a hydroxyethylcellulose containing from about 0.1 to about 10 $C_{16}$ alkyl side chains per 100 anhydroglucose units and from about 2.5 to about 4 ethylene oxide groups substituting each anhydroglucose unit.

The process of the present invention comprises forming a suspension of the monomer mixture, including a major amount of at least one water-soluble monomer and from about 0.1 to about 50 weight percent, based on the total monomer weight, of a crosslinking monomer, and optionally a minor amount of an additional, copolymerizable monomer, in an aqueous medium containing from about 5 weight percent to saturation of a water-soluble, non-reactive inorganic salt in the presence of from about 0.1 to about 5 weight percent of a monomer-soluble, free-radical initiator and from about 0.01 to about 4 weight percent of a nonionic surfactant-type dispersant having a hydroxyalkylcellulose backbone, a molecular weight of from about 30,000 to 2,000,000, and a hydrophobic, $C_1$ to about $C_{24}$ alkyl side chain, the alkyl side chains being present at a level of from about 0.1 to about 10 alkyl side chains per 100 repeating units of the polymer backbone, wherein the alkyl group in the hydroxyalkylcellulose backbone is from $C_1$ to $C_{24}$, establishing polymerization conditions in the suspension, allowing the monomers to polymerize until they have formed water-insoluble particles, and separating the particles from the aqueous phase.

The monomer phase forms spherical droplets within the aqueous phase; these are preferably kept suspended by agitation, but other techniques for maintaining suspension which will be readily apparent to those skilled in the art may be employed, as for example using a static mixer, or suspending the droplets in a liquid stream moving opposite to the direction in which the droplets tend to move by their density. The polymerization reaction occurs within the suspended monomer droplets, and is initiated by establishing a temperature in the droplet which is at least as great as the decomposition temperature of the polymerization initiator. A reasonable lower temperature for polymerization is about 50° C., which is above the decomposition temperature of many common initiators; one skilled in the art will realize that if an initiator is selected having a higher decomposition temperature than this, the minimum temperature will be chosen according to the decomposition temperature of the actual initiator used. The upper limit for the polymerization reaction is the boiling temperature of the suspending medium; the medium employed herein is aqueous, so at atmospheric pressure the maximum temperature will be 100° C., and higher temperatures may be used at higher pressures. A lower temperature may be advantageous to prevent decomposition of one or more of the monomers or the dispersant, or for other reasons which will be apparent to one skilled in the art.

The process of the present invention may be used for preparing both gel and macroporous resins. For the preparation of macroporous resins a porogen is commonly used. Porogens useful for making macroporous resins are well known to those skilled in the art; their nature and selection is discussed in, for example, U.S. Pat. No. 3,991,017. Porogens are substances in which the monomers are soluble but the resulting polymer is insoluble, and which will dissolve the monomers within the suspended droplet, without reacting with the other components of the polymerization mixture. Thus for the present process, sufficient porogen must remain within the suspended droplet to dissolve the monomer mixture at least partially, and to create the pores within the particle as the polymer forms. The preferred porogens are xylene and toluene.

The following examples are intended to illustrate the invention and not to limit it except as it is limited in the claims. All ratios and percentages given herein are by weight unless otherwise specified, and all reagents used in the examples are of good commercial quality unless otherwise specified.

EXAMPLE 1

This example is intended to illustrate the process of the present invention as used for preparing a crosslinked copolymer from water-soluble dimethylaminopropyl methacrylamide (DMAPMA) monomer, The dispersant used was a modified hydroxyethylcellulose substituted with about 4.0 moles of ethylene oxide per anhydroglucose unit and approximately 0.7–1.0 cetyl groups per 100 anhydroglucose units, and having a molecular weight of approximately 300,000 and a viscosity in 1% aqueous solution of approximately 400 megaPascals.

An aqueous solution was prepared by weighing 246.5 g sodium chloride, grinding approximately 15 g of this sodium chloride in a mortar with 3.72 g dispersant to a homogeneous mixture. The unground sodium chloride was added, with stirring, to 683.5 g deionized water at 50° C. The ground sodium chloride-dispersant mixture was added slowly to the water, which was then stirred at 50° C. until all the solids had dissolved.

A monomer mixture was made by mixing 159 g DMAPMA, 8.36 g high-purity divinylbenzene (80% purity) and 0.836 g diethyleneglycol divinyl ether. To 148 g oxylene was added, with stirring, 1.68 g 2,2'-azo-bis-(2,4-dimethylvaleronitrile) initiator.

The aqueous phase was placed in a reactor vessel and stirred at 52° C. The monomer mixture was mixed with the xylene-initiator solution and was transferred to the reactor vessel. Stirring at 52° C. was continued for 20 hours, after which the solids were drained and washed with water to remove the salt and most of the xylene.

The resulting anion exchange resin beads were porous, spherical, and free from agglomerated or misshapen particles. A 300-ml sample of these resin beads was conditioned by passing through it in the following sequence, at a flow rate of approximately 2 liters per hour, 1 liter of 4% aqueous sodium hydroxide solution, 1 liter of deionized water, 1 liter of 10% aqueous hydrochloric acid and 1 liter of deionized water. The resin was then backwashed with deionized water, allowed to settle, and then drained. One liter of 4% aqueous sodium hydroxide was then passed through the settled bed, followed by a final rinse of deionized water.

The conditioned resin bed was loaded with chloride by passing through it, at a continued at approximately 70 ml/minute until the effluent conductivity measured less volume (BV) of deionized water at the same flow rate. The deionized water flow was continued at approximately 70 ml/minute until the effluent conductivity measured less than 50 μmho. The resin bed was then backwashed with deionized water to remove trapped air and voids, and regenerated by passing through it, at a flow rate of 17 ml/minute, 500 ml of 4% aqueous sodium hydroxide. One BV of deionized water was then passed through the bed at 17 ml/minute, after which the flow of deionized water was increased to 70 ml/minute and continued until the conductivity of the rinse water fell below 50 μmho. The total volume of deionized water required to reduce the conductivity of the rinse water to this level was recorded as the rinse requirement, in bed volumes of water. The rinse requirement for this sample was 2.2 BV.

As a comparison, a sample of porous, spherical beads prepared by copolymerizing methyl acrylate with approximately 4% DVB and functionalized by aminolysis with dimethylaminopropylamine produced a resin of the prior art having the same anion-exchange functionality as the resin beads of this example. It should be noted that the molecular weight of a repeating monomer unit of the methyl acrylate copolymer is approximately 86, while after aminolysis, the molecular weight of a repeating unit is 156; thus the molecular weight of each monomer unit has approximately doubled, and the crosslinker content of the aminolyzed copolymer is therefore approximately 2%, compared to the 4% crosslinker of the copolymer of the present invention. This aminolyzed copolymer was subjected to the same procedure for determining the rinse requirement, and this was determined to be 11.7 BV. It is well known to those skilled in the art that lower crosslinking tends to produce materials that rinse more readily, because the rinse water can penetrate the copolymer more readily. Despite this, the resins of the present invention had a significantly lower rinse requirement than this prior-art resin.

From the above, it is seen that the method of the present invention is capable of producing spherical anion exchange resins free from agglomerated or misshapen particles, and having the particularly advantageous property of low rinse requirement.

EXAMPLE 2

This example illustrates the process of the present invention using DMAPMA and a different crosslinking monomer, trimethylolpropane triacrylate (TMPTA).

The spherical copolymer beads of this example were prepared using the same procedure as that of Example 1, except that 161.97 g DMAPMA, 8.525 g TMPTA and 139.5 g o-xylene were used, and the initiator weight was 1.705 g.

EXAMPLE 3

This example illustrates the process of the present invention using DMAPMA and additional TMPTA.

The spherical copolymer beads of this example were prepared using the same procedure as that of Example 2, except that the TMPTA content of the monomer mixture was increased from 5 to 10 weight percent, based on the total weight of the monomers.

EXAMPLE 4

This example illustrates the process of the present invention using DMAPMA and adding hexamethylene-bis-methacrylamide (HMBMA) to the TMPTA of Example 2 the crosslinking monomer. In this example the o-xylene was omitted to produce a gel resin bead.

The spherical copolymer beads of this example were prepared using the same procedure as that of Example 1, except that the crosslinking monomer used was 3% HMBMA and 3% TMPTA, based on the total weight of the monomers, and the o-xylene was omitted. The suspension mixture was heated to 55° C. for 14 hours.

I claim:

1. A process for preparing spherical, crosslinked copolymer beads from water-soluble monomers which comprises forming a suspension of a mixture of monomers, which mixture includes a major amount of at least one water-soluble monomer having a water solubility of at least about 10 grams per 100 grams of water, and from 0.1 to about 50 weight percent, based on the total monomer weight, of a crosslinking monomer, in an aqueous medium containing from about 5 weight percent to saturation of a water-soluble, non-reactive inorganic salt in the presence of a free-radical initiator and from about 0.01 to about 4 weight percent of a dispersant having a hydroxyalkylcellulose backbone, a molecular weight of from about 30,000 to 2,000,000, a hydrophobic alkyl side chain containing from 1 to about 24 carbon atoms, the alkyl side chains being present at a level of from about 0.1 to about 10 alkyl side chains per 100 repeating units of the polymer backbone, and an average of from about 1 to about 8 ethylene oxide groups substituting each repeating unit of the polymer backbone, wherein the dispersant is a nonionic surfactant and wherein the alkyl group in the hydroxyalkylcellulose backbone is from $C_1$ to $C_{24}$, establishing polymerization conditions in the suspension, and allowing the monomers to polymerize until they have formed water-insoluble particles.

2. The process of claim 1 wherein the water-soluble monomer or monomers has a water solubility of at least 10 gram per 100 grams of water.

3. The process of claim 1 wherein the water-soluble monomer or monomers has a water solubility of at least 50 gram per 100 grams of water.

4. The process of claim 1 wherein the water-soluble monomer or monomers is one or more amino-substituted acrylamides or methacrylamides or mixtures thereof.

5. The process of claim 4 wherein the amino-substituted acrylamides or methacrylamides are selected from the group consisting of dimethylaminopropyl methacrylamide, dimethylaminoethyl methacrylamide, dimethylaminopropyl acrylamide, dimethylaminoethyl acrylamide, N, N-bis-(dimethylaminoethyl) methacrylamide, N, N-bis-(dimethylaminopropyl) acrylamide, N, N-bis(dimethylaminoethyl) acrylamide, and N, N-bis-(dimethylaminopropyl) methacrylamide.

6. The process of claim 5 wherein the amino-substituted acrylamide is dimethylaminopropyl acrylamide.

7. The process of claim 5 wherein the amino-substituted methacrylamide is dimethylaminopropyl methacrylamide.

8. The process of claim 1 wherein the amount of crosslinking monomer is from about 0.1 to about 20 weight percent.

9. The process of claim 1 wherein the free-radical initiator is present at from about 0.01 to about 5 percent, based on the total weight of the monomers.

10. The process of claim 1 wherein the free-radical initiator is a peroxide or hydroperoxide initiator and is present at a level of from about 0.01 to about 3% by weight, based on the total weight of the monomers.

11. The process of claim 1 wherein the free-radical initiator is an azo initiator and is present at a level of from about 0.01 to about 2% by weight, based on the total weight of the monomers.

12. The process of claim 11 wherein the free-radical initiator is 2,2'-azo-bis-( 2,4-dim-dimethylvaleronitrile).

13. The process of claim 1 wherein the dispersant has an average of from about 1 to about 5 ethylene oxide groups substituting each repeating unit of the polymer backbone.

14. The process of claim 1 wherein the dispersant has an average of from about 2.5 to about 4 ethylene oxide groups substituting each repeating unit of the polymer backbone.

15. The process of claim 1 wherein the alkyl side chains of the dispersant are $C_{16}$ alkyl side chains.

* * * * *